(12) United States Patent
Bruland et al.

(10) Patent No.: US 8,892,501 B2
(45) Date of Patent: Nov. 18, 2014

(54) CAPTURING OLAP ANALYSIS THREAD AS REFRESHABLE BUSINESS INTELLIGENCE DATA

(75) Inventors: Axel Bruland, Bad Schoenborn (DE); Heike Guder, Wiesloch (DE); Karol Kalisz, Sandhausen (DE); Karim Mohraz, Wiesloch (DE)

(73) Assignee: SAP SE, Walldorf (DE)

( * ) Notice: Subject to any disclaimer, the term of this patent is extended or adjusted under 35 U.S.C. 154(b) by 741 days.

(21) Appl. No.: 12/644,032

(22) Filed: Dec. 22, 2009

(65) Prior Publication Data

US 2010/0287135 A1    Nov. 11, 2010

Related U.S. Application Data

(60) Provisional application No. 61/176,499, filed on May 8, 2009.

(51) Int. Cl.
*G06F 17/30* (2006.01)

(52) U.S. Cl.
CPC .... *G06F 17/30592* (2013.01); *G06F 17/30554* (2013.01)
USPC ........................................ 707/600

(58) Field of Classification Search
USPC ................. 707/600, 603, 713, 759, 707/999.001–999.004
See application file for complete search history.

(56) References Cited

U.S. PATENT DOCUMENTS

| | | | |
|---|---|---|---|
| 6,611,846 B1 * | 8/2003 | Stoodley | 707/740 |
| 7,243,106 B2 * | 7/2007 | Vierich et al. | 1/1 |
| 7,293,031 B1 | 11/2007 | Dusker et al. | |
| 7,415,438 B1 | 8/2008 | Berman et al. | |
| 7,523,462 B1 * | 4/2009 | Nesamoney et al. | 719/318 |
| 8,099,383 B2 * | 1/2012 | Naibo et al. | 707/603 |
| 2002/0032677 A1 * | 3/2002 | Morgenthaler et al. | 707/3 |
| 2002/0116213 A1 * | 8/2002 | Kavounis et al. | 705/1 |
| 2005/0262047 A1 | 11/2005 | Wu et al. | |
| 2006/0031209 A1 * | 2/2006 | Ahlberg et al. | 707/3 |
| 2006/0116859 A1 | 6/2006 | Legault et al. | |
| 2006/0271841 A1 | 11/2006 | Thanu et al. | |
| 2007/0027829 A1 | 2/2007 | Graf | |
| 2007/0027876 A1 | 2/2007 | Graf | |
| 2007/0130517 A1 | 6/2007 | Wu | |
| 2008/0104060 A1 * | 5/2008 | Abhyankar et al. | 707/5 |

OTHER PUBLICATIONS

European Patent Office; Extended European Search Report dated Aug. 18, 2010; EPO, Munich, Germany.
Cundus AG; We combine MS PowerPoint with SAP NetWeaver BI (BW) and other databases; 2008; Cundus AG; Duisburg, Deutschland; (http://www.cundus.de/fileadmin/user_upload/download/pdf/PDF_Englisch/cundus_Info_BIPublisher_engl.pdf).
SAP Businessobjects; Infuse Microsoft Office Documents With Business Intelligence; SAP® BusinessObjects™ Live Office; 2008; SAP AG; Walldorf and Germany; (http://tinyurl.com/yar7kb6).
Business Objects; Add Intelligence to Your Microsoft Office Documents; BusinessObjects Live Office; 2005; Business Objects SA; Levallois-Perret and France; (http://www.uk.businessobjects.com/pdf/products/reporting/live_office.pdf).

(Continued)

*Primary Examiner* — Alexy Shmatov

(57) ABSTRACT

Described herein are methods and systems for capturing OLAP analysis thread and transferring the data into a data visualization tool. According to one aspect, OLAP analysis step queries and the corresponding results are recorded and transferred to a data visualization tool. In another aspect, the data in the data visualization tool may be refreshed without affecting the data format.

18 Claims, 7 Drawing Sheets

(56) References Cited

OTHER PUBLICATIONS

Alan H. Tiedrich; "ProClarity Analytics Platform Business Intelligence (BI)"; Sep. 5, 2003; Gartner, Inc.; Stamford, CT, USA; (http://www.bus.umich.edu/KresgePublic/Journals/Gartner/research/101500/101520/101520.pdf).

Jeffrey Heer, Jock D. MacKinlay, Chris Stolte, and Maneesh Agrawala; Graphical Histories for Visualization: Supporting Analysis, Communication, and Evaluation; IEEE Transactions on Visualization and Computer Graphics; 2008; vol. 14, No. 6; IEEE; (http://vis.berkeley.edu/papers/graphical_histories/2008-GraphicalHistories-InfoVis.pdf).

Jock D. MacKinlay, Pat Hanrahan, and Chris Stolte; "Show Me: Automatic Presentation for Visual Analysis"; IEEE Transactions on Visualization and Computer Graphics; Nov.-Dec. 2007; vol. 13, Issue 6; IEEE; (http://domain1629264.sites.fasthosts.com/downloads/Show%20Me%20Whitepaper.pdf).

Jock D. MacKinlay, Pat Hanrahan, and Chris Stolte; "Show Me Automatic Presentation for Visual Analysis"; 2007; Tableau Software; USA; (http://www.vgtc.org/PDF/slides/2007/infovis/info_s02p03.pdf).

Yedendra Babu Shrinivasan & Jarke J. Vanwijk; Supporting the Analytical Reasoning Process in Information Visualization; Visualization to Support Information Work; 2008; Association for Computing Machinery; New York, USA; (www.win.tue.nl/~yedendra/imgs/chi1145-Yedendra-shrinivasan.pdf).

* cited by examiner

| AREA | PRODUCT | COST | SALES |
|---|---|---|---|
| | | | *1,000,000 |
| CALIFORNIA | FLATSCREEN VISION I | 991,276 | 10 |
| | NOTEBOOK SPEEDY I | 848,794 | 11 |
| | USB STORAGE | 4,130,343 | 9 |
| | IPHONES PX2 | 6,806,314 | 9 |
| FLORIDA | FLATSCREEN VISION I | 257,549 | 3 |
| | NOTEBOOK SPEEDY I | 237,471 | 3 |
| | USB STORAGE | 1,224,553 | 3 |
| | IPHONES PX2 | 1,954,277 | 3 |
| OVERALL RESULTS | | 16,450,577 | 51 |

FIGURE 1B

|  | A | B | C | D | E | F | G | H | I | J |
|---|---|---|---|---|---|---|---|---|---|---|
| 1 |  |  |  | CALENDAR YEAR 330 | 2003 | | 2004 | | OVERALL RESULT | |
| 2 |  |  |  | PRICE PER UM | BILLED QUANTITY ST | NET SALES *1000$ | BILLED QUANTITY ST | NET SALES *1000$ | BILLED QUANTITY ST | NET SALES *1000$ |
| 3 | CUSTOMER 310 | | PRODUCT 320 | | | | | | | |
| 4 | DS1 | SANDSTONE LTD | STEREO KIT | USD 22,90 | 13.679 | 31,34 | 12.308 | 28,20 | 25.987 | 59,54 |
| 5 |  |  | USB ADAPTOR | USD 9,18 | 5.55 | 50,93 | 4.99 | 45,83 | 10.54 | 96,76 |
| 6 |  |  | USB STORAGE | USD 22,90 | 43.617 | 99,90 | 42.255 | 96,78 | 85.872 | 196,68 |
| 7 |  |  | CAMERA CONNECTOR | USD 45,90 | 15.390 | 70,51 | 13.849 | 63,45 | 29.239 | 133,96 |
| 8 |  |  | FLATSCREEN VISION I | USD 1.064,00 | 1.109 | 11,75 | 0.998 | 10,58 | 2.107 | 22,33 |
| 9 |  |  | HARDDRIVE ONTOUR | USD 506,00 | 4.269 | 21,55 | 3.842 | 19,39 | 8.111 | 40,93 |
| 10 |  |  | RESULT |  | 83.614 | 285,98 | 78.242 | 264,22 | 161.856 | 550,20 |
| 11 | DS10 | ADEPT SERVICES INC | STEREO KIT | USD 22,90 | 12.530 | 28,71 | 13.431 | 30,77 | 25.961 | 59,48 |
| 12 |  |  | USB ADAPTOR | USD 9,18 | 9.973 | 91,50 | 10.692 | 98,09 | 20.665 | 189,58 |
| 13 |  |  | USB STORAGE | USD 22,90 | 4.694 | 10,76 | 5.034 | 11,54 | 9.728 | 22,30 |
| 14 |  |  | CAMERA CONNECTOR | USD 45,90 | 4.304 | 19,73 | 4.614 | 21,16 | 8.918 | 40,89 |
| 15 |  |  | FLATSCREEN VISION I | USD 1.064,00 | 5.757 | 60,72 | 5.651 | 59,62 | 11.408 | 120,35 |
| 16 |  |  | HARDDRIVE ONTOUR | USD 506,00 | 9.704 | 48,93 | 9.915 | 50,00 | 19.619 | 98,93 |
| 17 |  |  | RESULT |  | 46.962 | 260,36 | 49.337 | 271,18 | 96.299 | 531,54 |
| 18 | DS100 | BRAKE SERVICES CO INC | USB STORAGE | USD 22,90 | 52.170 | 119,48 | 46.956 | 107,54 | 99.126 | 227,02 |
| 19 |  |  | CAMERA CONNECTOR | USD 45,90 | 4.699 | 21,55 | 4.229 | 19,39 | 8.928 | 40,94 |
| 20 |  |  | FLATSCREEN VISION I | USD 1.064,00 | 6.682 | 70,51 | 6.017 | 63,47 | 12.699 | 133,98 |
| 21 |  |  | HARDDRIVE ONTOUR | USD 506,00 | 8.155 | 41,14 | 7.341 | 37,02 | 15.496 | 78,16 |
| 22 |  |  | RESULT |  | 71.706 | 252,68 | 64.543 | 227,42 | 136.249 | 480,10 |
| 23 | OVERALL RESULT |  |  |  | 202.282 | 799,02 | 192.122 | 762,82 | 394.404 | 1.561,84 |

FIGURE 3

```
<BICS_VIEW>
  <SERVICE_DESCRIPTION> [...]
  <INFO_PROVIDER NAME="ZKMA_PLAN" TEXT="ZKMA_PLAN"/>
  QUERY NAME="KM_VINE_SALES" TEXT = "VINE SALES"> [...]
  <VARIABLES>[...]
  <SELECTION_SPACE> [...] 430
  <SELECTION_STATE> [...] 440
  <CHARACTERISTICS> [...]
  <CUSTOM_PARAMETERS/>
  <AXES>
    <AXIS NAME="ROWS">[...] 410
    <AXIS NAME="COLUMNS">[...] 420
    <AXIS NAME="FREE">[...]
  </AXES>
  <DATA_CELLS SIGNPRESENTATION="BEFORE_NUMBER" ZEROPRESENTATION="NORMAL">
  <RESULT_SET_SIZE_LIMIT>0</RESULT_SET_SIZE_LIMIT>
  <DRILL_OPERATIONS/>
  <EXCEPTIONS/>
  <CONDITIONS/>
  <RESULT_SET STATE="DATA_AVAILABLE">[...] 450
<BICS_VIEW>
```

FIGURE 4

CAPTURING OLAP ANALYSIS THREAD AS REFRESHABLE BUSINESS INTELLIGENCE DATA

This application claims the benefit of and priority to U.S. Provisional Patent Application No. U.S. 61/176,499, filed 8 May 2009, titled "CAPTURING OLAP ANALYSIS THREAD AS REFRESHABLE BUSINESS INTELLIGENCE DATA," which is incorporated herein by reference in its entirety.

TECHNICAL FIELD

The invention relates to Online Analytical Processing (OLAP) analysis. More precisely, the invention relates to transforming an OLAP analysis thread into a content to be presented in a data visualization tool.

BACKGROUND

OLAP analysis is form analysis associated with multidimensional data and ad hoc methods. OLAP ad-hoc analysis typically includes analyzing multidimensional data by dissecting, aggregating and filtering the data along a number of dimensions and measures. Often there is a need to convey the insight gained by the analysis to others. One of the most popular means of sharing insights involves building a presentation mixing text and visualizations of the back-end data. However, transferring the data from a Business Intelligence (BI) OLAP client into a data visualization tool such as PowerPoint by Microsoft Corporation or a word processing tool where the data can be presented along with questions, answers or insights, can be very time consuming and often needs to be repeated when the underlying data changes.

There are several tools that allow for an interface to import or connect back-end data into front end tools such as applications in the Microsoft Office suite. For example, SAP BusinessObjects Live Office, available from SAP Americas, Palo Alto, Calif., allows a user to place visualizations of data in a data visualization tool and refresh them periodically. However, when creating or refreshing such visualizations the user has to manually save each query view and import them to the visualization tool one by one. Providing a way to transform the steps followed in generating the reports and the analysis within an OLAP tool and import them into a data visualization tool like Microsoft PowerPoint may reduce the manual intervention and make the transition between reporting and visualization environments more seamless.

SUMMARY

Various embodiments of computer implemented methods and systems for converting an OLAP analysis thread into content to be presented via a data visualization tool are described herein. In one embodiment of the invention, the method includes recording an analysis step that changes a corresponding query to a multidimensional data source, wherein the query is associated with a first part of an analysis step record for the analysis step and recording a result set corresponding to the query as a second part of the analysis step record. The method also includes transferring the analysis step record into a data visualization tool.

In another embodiment of the invention, the system includes an OLAP database, a data access interface to provide homogenous data access, and an OLAP client to send requests to the data access interface. The OLAP client is able to keep track of the queries sent and the results received and may transfer the tracked data into a data visualization tool.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 1B is a block diagram of an exemplary table data that is subject of OLAP analysis.

FIG. 3 is block diagram comprising exemplary data that is subject of OLAP analysis.

FIG. 4 is an exemplary illustration of the content of a BICS XML file.

DETAILED DESCRIPTION

Embodiments of techniques for capturing OLAP analysis thread and transferring the data into a data visualization tool are described herein. In the following description, numerous specific details are set forth to provide a thorough understanding of embodiments of the invention. One skilled in the relevant art will recognize however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

While analyzing multidimensional data by dissecting, aggregating and filtering the data along a number of dimensions and measures, the user leaves a trail. Such trail may comprise member selection, navigation, pivoting (e.g. filter, drilldown), drilling down, drilling up, creating a calculated member, and so on. This trail can be identified as a sequence of query "snapshots", recorded and added to a data visualization tool.

Figure 1A:
FIG. 1A is a block diagram comprising exemplary data that is subject of OLAP analysis.

FIG. 1A represents an initial state of a table of data 100. If the query is changed so as to dissect the data by an additional dimension, sales area, then the result will be the table of data 150 as shown in FIG. 1B with the sales "Area" 110. This is an example of an analysis step that changes the query and is part of a trail created in an analysis thread.

Figure 2:
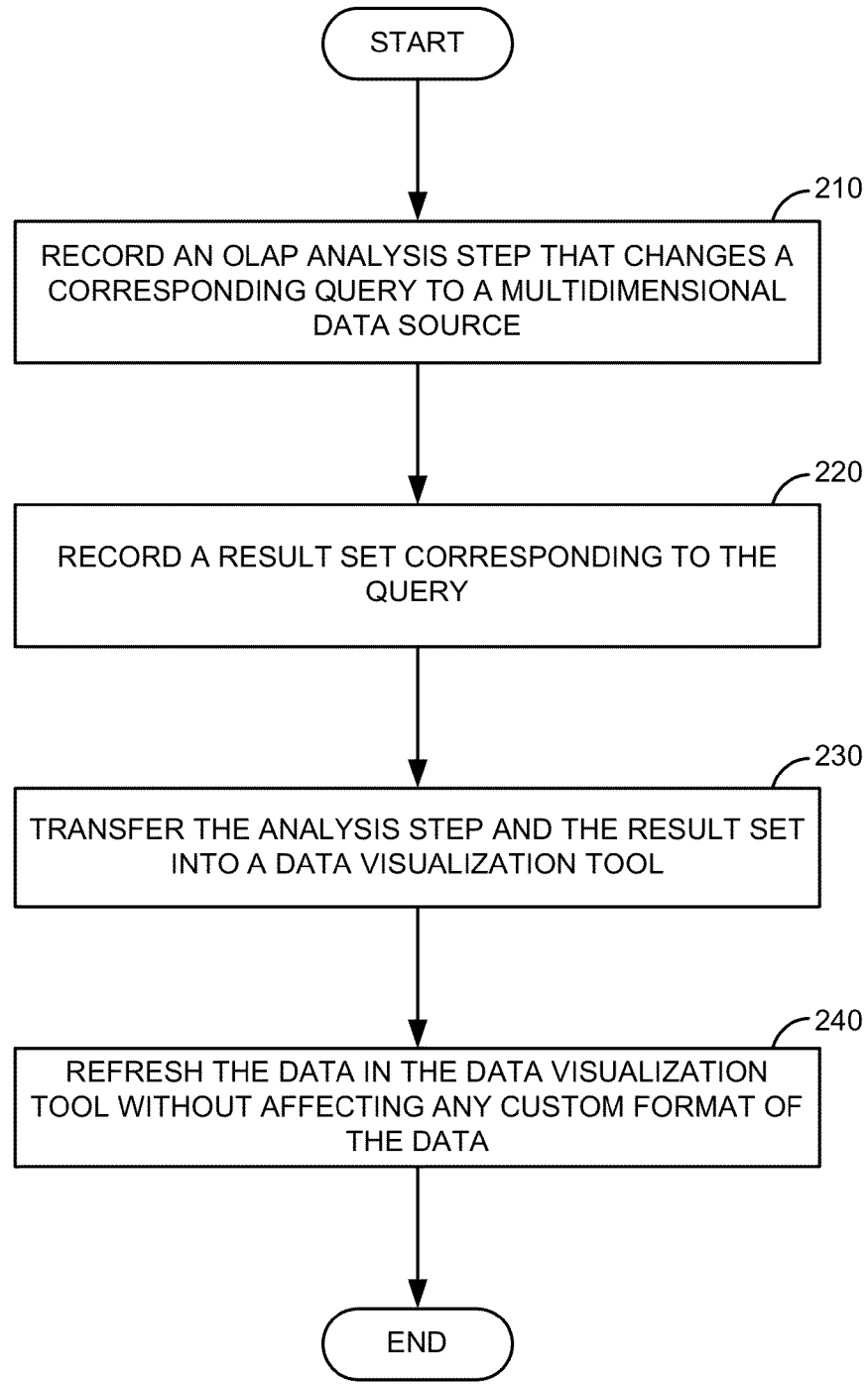
FIG. 2 is a flow diagram of an embodiment of the invention for transforming an OLAP analysis thread into content to be presented via a data visualization tool.

FIG. 2 illustrates an exemplary method for transforming an OLAP analysis thread into content to be presented via a data visualization tool without having to generate separate queries. According to FIG. 2, at block 210, each analysis step that changes a corresponding query to a multidimensional data source is recorded. The analysis step that changes a query is the changed query itself. The user can start, stop, and pause the recording at any time by pressing, for example, one or more buttons in the interface designed to resemble the interface of a tape recorder. This recording feature may be implemented as part of an Add-In program to an OLAP client. However, while conducting an OLAP analysis, not every step is considered as an analysis step and not every step has to be recorded. Only actions that lead to actual change in the query are considered as part of the analysis. For instance, execution of commands such as "format data" or "input data in empty cell", do not affect the query. Such commands are generally not of interest for the analysis and they need not be recorded.

Referring again to FIG. 2, at block 220, a result set corresponding to the query is recorded. According to one embodiment, both of the query and the result set form an analysis step record. An analysis step record is a snapshot of the analysis representing exactly one snapshot in a recording of an analysis. In one embodiment, the analysis step record is stored in a file. This file serves as a mediator for transferring the data representing the analysis step record. The mediator file is meant to hold the analysis step record in a format that may be read by other applications, for example, data visualization tools. The feature of reading the mediator file may be implemented as part of an Add-In program to the data visualization tool. Specifically each changed query is saved in the computer's memory. For each changed query an analysis step record is added to a list. Each of these analysis step records can be saved (e.g., serialized) as an Extensible Markup Language (XML) document. Thus, the analysis step records in an XML file may be used by other applications such as data visualization tools.

In one embodiment, the XML document is Business Intelligence Consumer Services (BICS) XML document. Business Explorer (BEx) Analyzer from SAP AG, Walldorf, Germany uses the BICS data access interface, which allows to query data from multiple relational and OLAP data sources. U.S. Pub. No. 2007-0027876 A1 and U.S. Pub. No. 2007-0027829 A1 explain this technology in further detail and are incorporated herein by reference. Hierarchies and other BI specific features are available in the BICS data access interface. BICS data access interface provides an Application Programming Interface (API) for defining queries and retrieving the result set via a proprietary XML document. Thus any query "snapshot" can be exchanged by transferring the BICS XML document. FIG. 3 represents exemplary data that is subject of OLAP analysis and FIG. 4 represent the content of a BICS XML file according to one embodiment. The first part of the content is a structural description of the query, for example, Customer dimension 310×Product dimension 320 on row axis (XML tag <axis "rows"> 410), Calendar Year dimension 330×Measures 340 (XML tag <axis "columns"> 420) on column axis, global and dynamic filters (XML tags <Selection Space> 430 and <Selection_State> 440). The second part of the content is the data in the result set 350 (XML tag <Result_Set> 450). The result set 350 is represented as a matrix with the data.

Turning back to FIG. 2, each analysis step record is transferred from the mediator file, such as a BICS XML document, into a data visualization tool, as shown in block 230. A data visualization tool can be any type of document editor where the focus is on formatting, arranging and presenting the data (e.g., Microsoft PowerPoint, IBM Lotus Symphony Presentations, etc). In some embodiments, a brief description for the query snapshot is translated into natural language and placed as a title on a slide in the data visualization tool. This may be done, for example, by placing the localized common names of measures, dimensions, filter values, and the like in a sentence with appropriate punctuation and supporting phrases. In some embodiments, the result set of an analysis step record is placed as a visual presentation of data, such as a table or chart, on a separate slide in the data visualization tool. Then the slides in the data visualization tool may be formatted or deleted if it is not needed for conveying the main message of the performed analysis.

In one embodiment, only the query is recorded in a mediator file but not the result set. After transferring the query to the data visualization tool, the result set can be retrieved, because the query exactly defines a description of how to retrieve the result set.

In one embodiment, if the data comes from a spreadsheet grid, it is displayed as a PowerPoint table. In another embodiment, if it was displayed as a chart in a spreadsheet application then the PowerPoint slide will also display a chart. In general, OLAP tools support visualizations, such as, tables (e.g. crosstabs), charts, maps and tag clouds. After the data in the visualization is placed on PowerPoint slides, the data may be converted from one form of visualization to another. For example, from a table to a chart or vice versa. In one embodiment, if a table does not fit on one slide, the data may be split and distributed over several slides.

In another embodiment, a "Table of Contents" slide is generated automatically after all slides have been created: one slide with the list of the selected slide titles, which are hyperlinked to the corresponding slide. This allows fast detection of a concrete analysis step.

Referring again to FIG. 2, at block 240, the data in the slide presentation or any other data visualization tool is refreshed in a manner that does not affect the formatting of the data. Since a refresh does not change the filters or query definition, the slide title and its edits to it are not affected by the refresh. Only the data in the table/chart is updated.

In one embodiment, there might be two or more queries in a spreadsheet application, for example Microsoft Excel, Lotus 123, with two crosstabs based on their own queries with differing dimensions, measures, filter values or the like. If the analysis starts with steps on the first query and continues with some other steps on the second query and switches back and forth, this does not seem to be a very common task for tracing the two threads. If necessary from business user perspective, the analysis step records for the two different queries may be separated by using query name metadata. Thus the data for two threads will be transferred to two separate data visualization tool documents.

Figure 5:
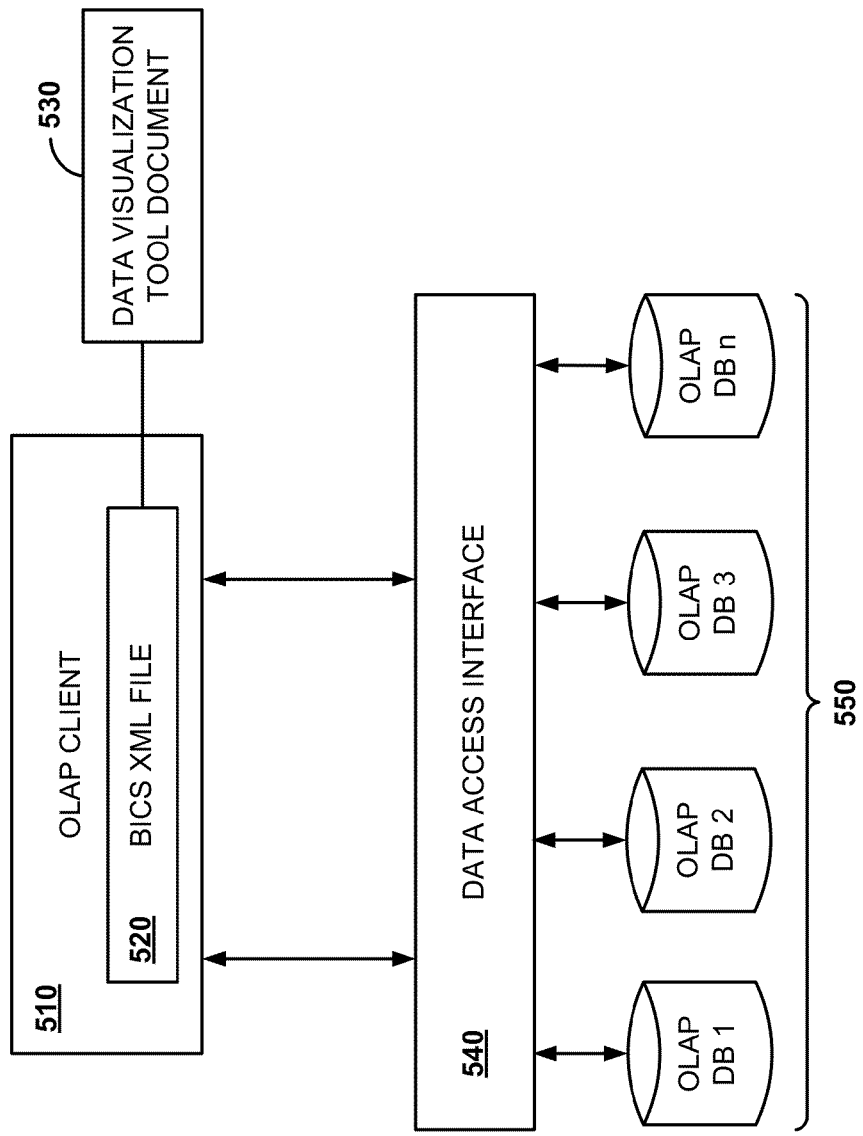
FIG. 5 is a block diagram of an embodiment of the invention for transforming an OLAP analysis thread into content to be presented via a data visualization tool.

FIG. 5 represents a block diagram of an embodiment of the invention for transforming an OLAP analysis thread into a data visualization tool. The system consists of an OLAP client 510, a data access interface 540 and relational and OLAP databases 550. The OLAP client 510 may save data in BICS XML file 520 and transfer this data to a data visualization tool document 530.

An analysis is performed, where an OLAP client 510, for example in the form of an Application Programming Interface (API), is used to create queries and analyze data from the databases 550. The OLAP client 510 sends queries, which are translated to the respective database from the OLAP databases 550 through the data access interface 540. The data access interface 540 is used for translating the data from the OLAP client 510 into a format native for the different databases 550. In one embodiment, the data access interface 540 may also be able to define which database to search in for the required data, depending on the request from the OLAP client 510. After a query is executed, the result is sent back through the data access interface 540 to the OLAP client 510. The OLAP client, by itself, may be operable to keep track of the queries and the responsive results during the analysis. Each analysis query and its correspondent result are saved in a BICS XML file 520. This is possible because the result set is translated back into the format of the OLAP client 510 through the data access interface 540. As the queries come from the OLAP client 510, the queries can be inserted in the same BICS XML file 520 together with the result set. Thus, the requested data can be serialized in a BICS XML file 520 regardless of the nature and the format of the requested data. The data in the BICS XML file 520 may then be transferred to a data visualization tool document 530. The data visualization tool document 530 serves as a basis for a presentation describing the analysis thread being performed. In one embodiment, a previously created data visualization tool document 530 may refresh the existing data, while preserving the custom format of the data in the data visualization tool document 530.

According to one embodiment, the process of compiling a set of queries as a slide presentation can also be used for creating a "briefing book", where the data can be refreshed periodically. In addition, a presentation may contain an agenda or overview of topics (e.g. table of contents). A link from the overview slide to the specific slide will allow the user to quickly access the information needed.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include computer code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with computer readable software instructions.

Figure 6:
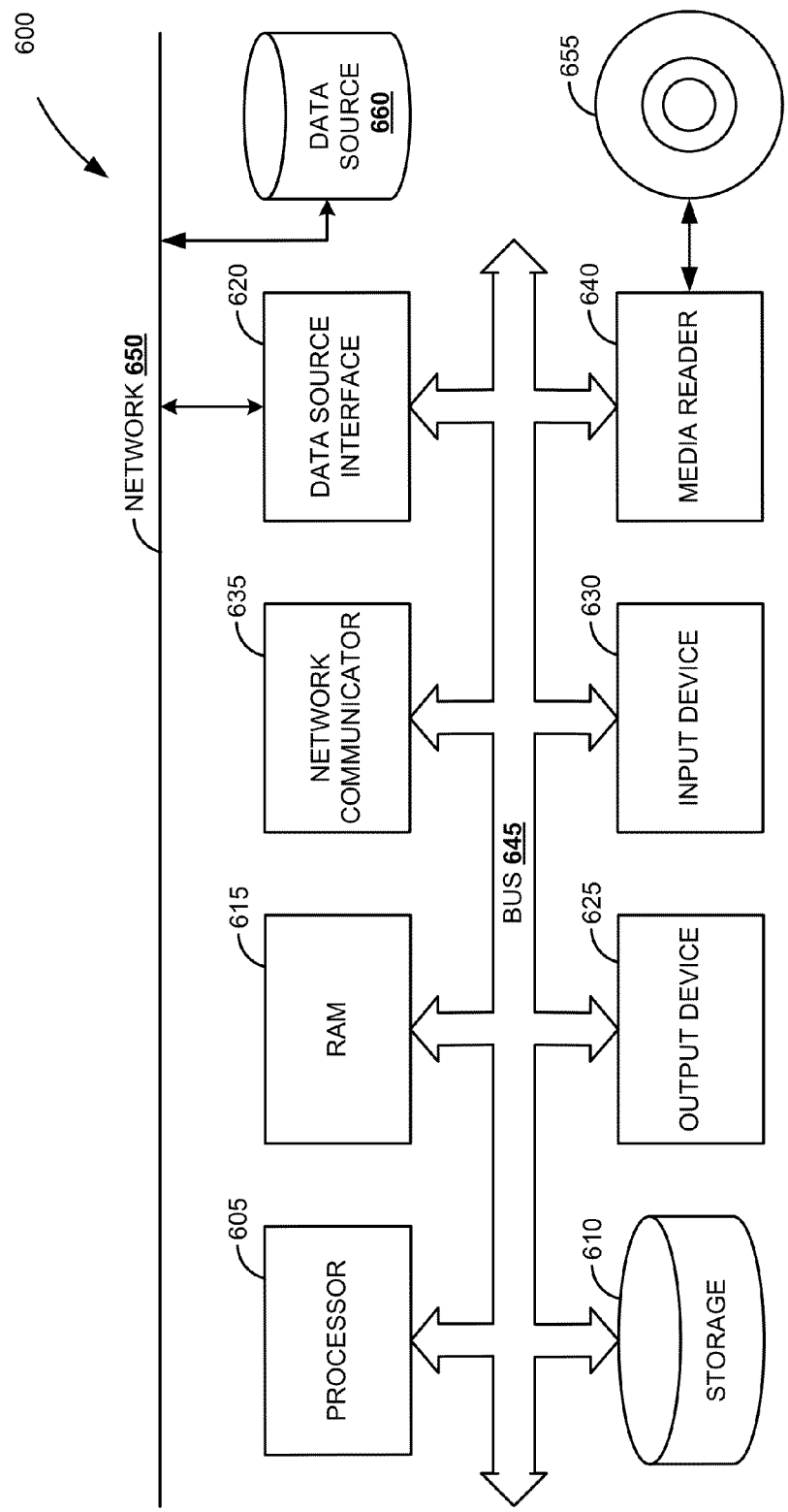
FIG. 6 is a block diagram of an embodiment of the invention for a computer system for transforming an OLAP analysis thread into content to be presented via a data visualization tool.

FIG. 6 is a block diagram of an exemplary computer system 600. The computer system 600 includes a processor 605 that executes software instructions or code stored on a computer readable medium 655 to perform the above-illustrated methods of the invention. The computer system 600 includes a media reader 640 to read the instructions from the computer readable medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be access via one or more abstraction layers implemented in hardware or software. For example, the data source 660 may be accessed through network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable medium comprising computer readable instructions, which, when executed by a computer, causes the computer to perform a method, the method comprising:
   recording an analysis step from an OLAP analysis, wherein the analysis step changes a corresponding query, the query made to a multi-dimensional data source on an OLAP server, wherein the analysis step that changes the corresponding query comprises a structural description of the changed query, and wherein the structural description of the changed query is associated with a first part of an analysis step record for the analysis step;
   recording a result set corresponding to the changed query, wherein the result set is associated with a second part of the analysis step record; and
   transferring the analysis step record to a data visualization tool, wherein the analysis step record is placed on a first slide in the data visualization tool and wherein a second slide in the data visualization tool comprises a link for quick access to the analysis step record placed in the first slide.

2. The computer readable medium of claim 1, further comprising storing the analysis step record in a file, the file to serve as a mediator to the data visualization tool.

3. The computer readable medium of claim 2, wherein the file is a BICS XML document.

4. The computer readable medium of claim 1, wherein the analysis step record is placed as a table or a chart in the data visualization tool.

5. The computer readable medium of claim 1, further comprising refreshing the transferred analysis step record in the data visualization tool.

6. The computer readable medium of claim 5, wherein refreshing the transferred analysis step record in the data visualization tool does not affect the data format.

7. The computer readable medium of claim 1, wherein the first part of the analysis step record is translated in a natural language and placed as a title of the first slide.

8. A computerized method for transforming an OLAP analysis into a data visualization tool, comprising:
   recording an analysis step from the OLAP analysis, wherein the analysis step changes a corresponding query, the query made to a multi-dimensional data source on an OLAP server, wherein the analysis step that changes the corresponding query comprises a structural description of the changed query, and wherein the structural description of the changed query is associated with a first part of an analysis step record for the analysis step;
   recording a result set corresponding to the changed query, wherein the result set is associated with a second part of the analysis step record; and
   transferring the analysis step record to a data visualization tool, wherein the analysis step record is placed on a first slide in the data visualization tool and wherein a second slide in the data visualization tool comprises a link for quick access to the analysis step record placed in the first slide.

9. The method of claim 8, further comprising storing the analysis step record in a file, the file to serve as a mediator to the data visualization tool.

10. The method of claim 9, wherein the file is a BICS XML document.

11. The method of claim 8, wherein the analysis step record is placed as a table or a chart in the data visualization tool.

12. The method of claim 8, further comprising refreshing the transferred analysis step record in the data visualization tool.

13. The method of claim 12, wherein refreshing the transferred analysis step record in the data visualization tool does not affect the data format.

14. The method of claim 8, wherein the first part of the analysis step record is translated in a natural language and placed as a title of the first slide.

15. A system for transforming an OLAP analysis into a data visualization tool, comprising:
   an OLAP database;
   a data access interface to connect to the OLAP database and provide unified data access;
   an OLAP client to send queries to the data access interface;
   a BICS XML file to keep track of the queries sent and the results received;
   a data visualization tool document to present the data from the BICS XML file;
   one or more processors; and
   one or more non-transitory memory devices, the memory devices having stored thereon instructions related to a processing module configured to:
      record an analysis step from an OLAP analysis, wherein the analysis step changes a corresponding query, the query made to the OLAP database on an OLAP server, wherein the analysis step that changes the corresponding query comprises a structural description of the changed query, and wherein the structural description of the changed query is associated with a first part of an analysis step record for the analysis step;
      record a result set corresponding to the changed query, wherein the result set is associated with a second part of the analysis step record;
      transfer the analysis step record to the data visualization tool document, wherein the analysis step record is placed on a first slide in the data visualization tool document and wherein a second slide in the data visualization tool document comprises a link for quick access to the analysis step record placed in the first slide.

16. The system of claim 15, wherein the data visualization tool document is refreshed upon receiving notice of updates in the OLAP database.

17. The system of claim 16, wherein the data in data visualization tool document is refreshed without affecting any custom format of the data.

18. The system of claim 15, wherein the first part of the analysis step record is translated in a natural language and placed as a title of the first slide.

\* \* \* \* \*